United States Patent [19]

Poillon et al.

[11] Patent Number: 5,056,791
[45] Date of Patent: Oct. 15, 1991

[54] GOLF SIMULATOR AND ANALYZER SYSTEM

[75] Inventors: Nannette Poillon, 21 Craig Ct., Stamford, Conn. 06903; Roland Melzer, Escondido, Calif.; Ronald F. Sienko, Southbury, Conn.

[73] Assignee: Nannette Poillon, New York, N.Y.

[21] Appl. No.: 448,241

[22] Filed: Dec. 11, 1989

Related U.S. Application Data

[63] Continuation-in-part of Ser. No. 413,789, Sep. 28, 1989.

[51] Int. Cl.⁵ .............................................. A63B 69/36
[52] U.S. Cl. ............................ 273/185 B; 273/185 A; 273/185 R; 273/181 C
[58] Field of Search ........... 273/181 R, 181 C, 181 K, 273/183 R, 183 A, 185 R, 185 A, 185 B, 348, 372

[56] References Cited

U.S. PATENT DOCUMENTS

| | | | |
|---|---|---|---|
| 2,331,236 | 10/1943 | Schaefer | 273/181 C |
| 2,784,000 | 3/1957 | Simjian | 273/181 C |
| 2,784,001 | 3/1957 | Simjian | 273/185 A |
| 2,954,232 | 9/1960 | Auer | 273/185 R |
| 3,678,495 | 7/1972 | Gilbert | 273/372 |
| 3,857,022 | 12/1974 | Rebane et al. | 273/372 |
| 3,938,809 | 2/1976 | Gentiluomo | 273/184 R |
| 4,086,630 | 4/1978 | Speiser et al. | 273/185 A |
| 4,437,672 | 3/1984 | Armantrout et al. | 273/185 B |

FOREIGN PATENT DOCUMENTS

| | | | |
|---|---|---|---|
| 0278150 | 8/1988 | European Pat. Off. | 273/183 R |
| 2005549 | 4/1979 | United Kingdom | 273/185 B |
| 2154146 | 9/1985 | United Kingdom | 273/185 A |

OTHER PUBLICATIONS

Kelley, "A Hot New Club for Par-Tee Animals", *Washington Post Magazine*, Feb. 1988; pp. 12-13.

*Primary Examiner*—Edward M. Coven
*Assistant Examiner*—Jessica J. Harrison
*Attorney, Agent, or Firm*—Grimes & Battersby

[57] ABSTRACT

A system that simulates indoors a game of golf as it would be played outdoors on a conventional golf course and also provides the player with a diagnosis of his golf swing. An accurate determination is made of the trajectory, spin and velocity of a driven golf ball is made to determine the flight path it would take in an unimpeded ennvironment. From this information there is provided to the player a projected image that his golf ball would take on a real golf course as well as diagnostic information about his swing.

18 Claims, 5 Drawing Sheets

FIG. I

GOLF SIMULATOR AND ANALYZER SYSTEM

BACKGROUND OF THE INVENTION

This application is a continuation in part of patent application Ser. No. 413,789 filed Sept. 28, 1989, now pending.

1. Field of the Invention

The present invention relates to a method and apparatus for the indoor simulation of a game of golf as it would be played on a conventional outdoor golf course in a manner consistent with the accepted rules of golf. Although the invention is described in relation to a game of golf, elements of the invention would have utility in simulating other sports played in a self-contained indoor environment. In addition to indoor simulation of an outdoor golf game, the present system contemplates the diagnosis of the player's golf swing to provide the player with information including an analysis of his swing, e.g. whether the impact of the swing hooks or slices the ball.

Golf simulation games are generally known and usually of a size that fit indoors within an enclosed premises. These simulated games conventionally provide a tee area, target and in some instances a putting area. The player tees off in a normal manner and his drive is measured and relayed in yardage to simulate a drive on a natural golf course. The simulation is accomplished by appropriate controls that receive signals from a swing analyzer at the initiation site and a distant screen which is impacted by a golf ball.

The present invention is an improved golf simulator which employs a golf swing analyzer combined with a projectile determination system that when employed together provide the player with a very accurate simulated image of the flight path his golf ball would take on an unimpeded golf range along with information resulting from an analysis of his swing when he hit the ball on the simulated tee.

2. Description of the Prior Art

As noted above, the prior art includes golf simulating machines and two of these are shown in U.S. Pat. No. 3,508,440 to Murphy and in U.S. Pat. No. 3,712,424 to Conklin. These patents disclose simulated golf games including tee areas, screens to receive a driven ball and systems to determine the flight characteristics or trajectory of the ball. One of the major problems with these prior art machines is that they do not accurately determine the characteristic of the ball's flight path including trajectory, velocity and spin. In addition they fail to provide a diagnostic analysis of the player's swing.

Other patents of the prior art are cited and discussed in the above-cited parent application Ser. No. 413,789.

SUMMARY OF THE INVENTION

Against the foregoing background, it is a primary object of the invention to provide an accurate simulation of a game of golf which can be used for recreation or competition in addition to diagnostics and training of individuals interested in the enjoyment of, or improvement in, the game of golf.

It is another object of the present invention to provide a simulated golf game in which the system is located indoors and a screen is provided that accurately displays portions of an actual golf course and superimposes the flight path that a golf ball would follow if hit on a golf course corresponding to the drive in the simulator.

It is a further object of the present invention to provide a highly accurate golf simulator that can be programmed to realistically display the progress that a golf game would take on an outdoor golf course.

It is a further object of the present invention to provide a golf simulator in which the projected image of the ball flight is extrapolated from the initial ball flight parameters that are derived from the swing analyzer and the projectile determination system.

It is still a further object of the present invention to provide a golf simulator in which there is projected multiple views of the hole in play including a perspective view as well as an overhead view.

In general, the system of the present invention contemplates a tee area in which a golf ball is driven to a distant screen on which there is projected views of a portion of a chosen golf course. The player will drive the golf ball from the tee to the screen and various characteristics of both his swing and the driven ball will be detected and fed to appropriate information processing units to provide an image on the screen of the flight path the ball would take on a natural golf course and further provide diagnostic information regarding the player's swing.

BRIEF DESCRIPTION OF THE DRAWINGS

The foregoing and still other objects and advantages of the present invention will be more apparent from the following detailed explanation of the preferred embodiments of the invention in connection with the accompanying drawings herein in which.

DESCRIPTION OF THE PREFERRED EMBODIMENT

Figure 1:
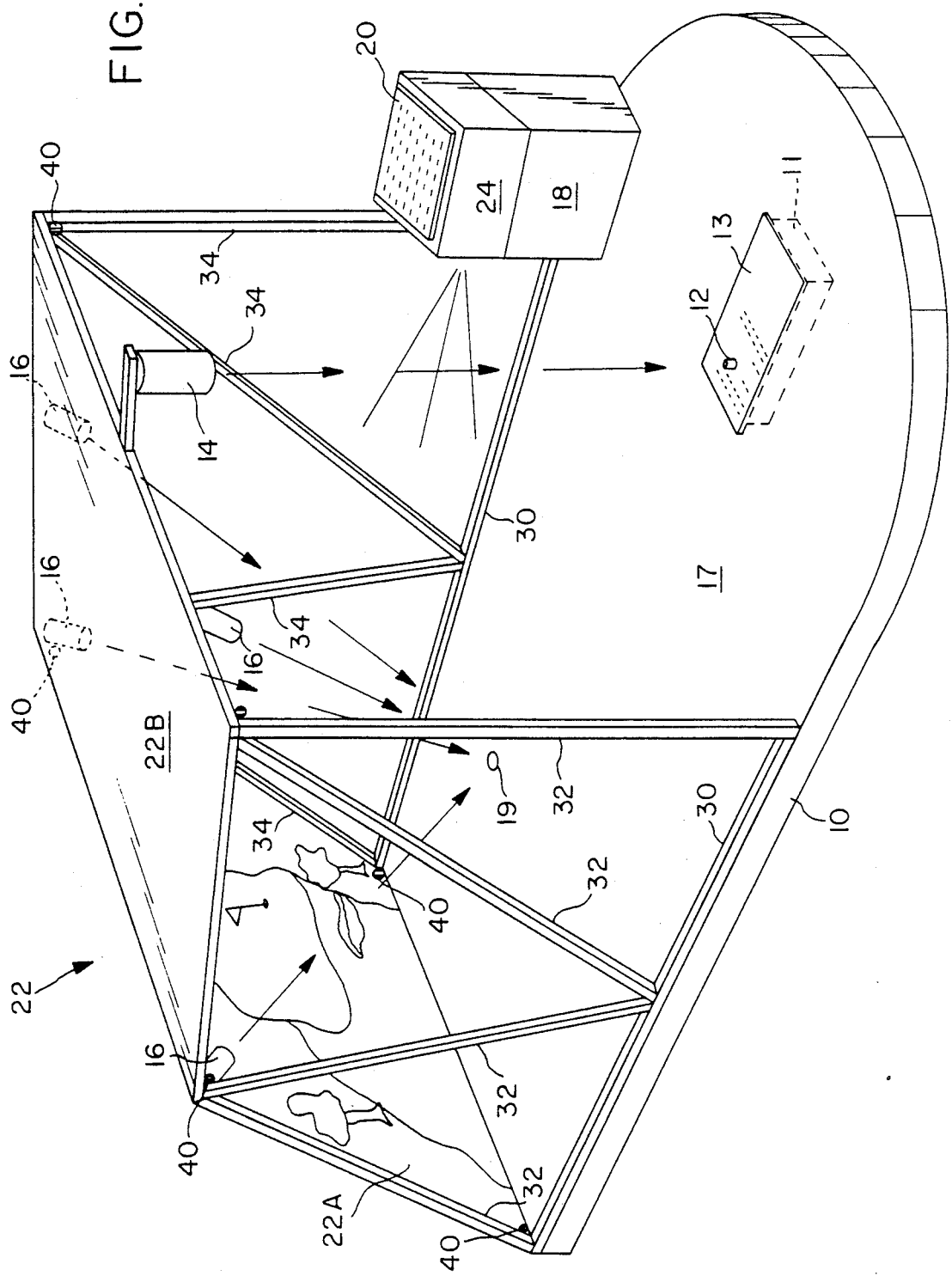
FIG. 1 is a schematic perspective view of the indoor golf simulator system of the present invention showing the physical relationship of the principal components.

Referring now to the drawings and more particularly to FIG. 1, the overall system of the present invention will be described before considering the details of the individual components. A base member 10 is provided that serves as a mount for the various components. Swing analyzer 11 is secured to the base 10 toward the forward end thereof and contains a tee area 12 on a playing surface 13 which may be of artificial grass. A tee light 14 is positioned to illuminate the tee area and a plurality of putting lights 16 are located to illuminate a putting area 17 and are illuminated under computer control as hereinafter described when the putting area is to be used.

The system is under the control of a computer 18 having an associated keyboard 20 located within a console at the forward or entrance end of the simulator. A screen generally indicated at 22 is constructed and mounted at the other end of the simulator base. The screen serves to receive the impact of a driven golf ball and is suitable to display projected images from a projector 24 which may be positioned in the console.

The player may utilize the simulator for recreational purposes or he may be particularly interested in an analysis and diagnosis of his swing. In either event the player will conventionally select a golf course that he desires to have simulated for play. The system contemplates a library of recorded images of existing, actual golf courses. Each course will have been imaged on a CD ROM disc and these various discs are maintained and inventoried by the golf simulator operator. Thus a player will initially request a particular course and the associated CD-ROM will be selected and inserted in the computer 18 for realistic simulation on the screen. One type of CD-ROM used was a Sony 550 MB which stores the digitized golf course images, audio, graphics and some software. After the particular course is selected a start button on the keyboard is pressed and introductory instructions are projected by the projector 24 to appear on the screen 22. Introductory material may include a brief tutorial and it will ask the player which of a number of modes he wants to play. The mode selection may be, for example, tournament games, self instruction, driving range, one hole or nine holes or all eighteen holes of the selected course or a combination thereof. In addition, the instructions will request certain player data as name, right or left handed, handicap, etc. This data will be inserted in the computer by means of the keyboard 20.

As noted above, a library of CD-ROMs will be complied containing information on each of a number of golf courses. Thus each such compact disk will serve to project appropriate views of the selected course and also alter or effect the imaged view of the golf ball due to the course geography. Each golf course is mapped to determine and record the topography and obstacles. This may be accomplished through a three-dimensional modeling and grid procedure to provide a software accessible map of each hole. In general, for each hole of a course the area is overlaid with a grid which is divided into cells, each of which will contain the geographical characteristics of the land in that cell. Thus each will contain information on the type of terrain and the elevations.

Figure 2:
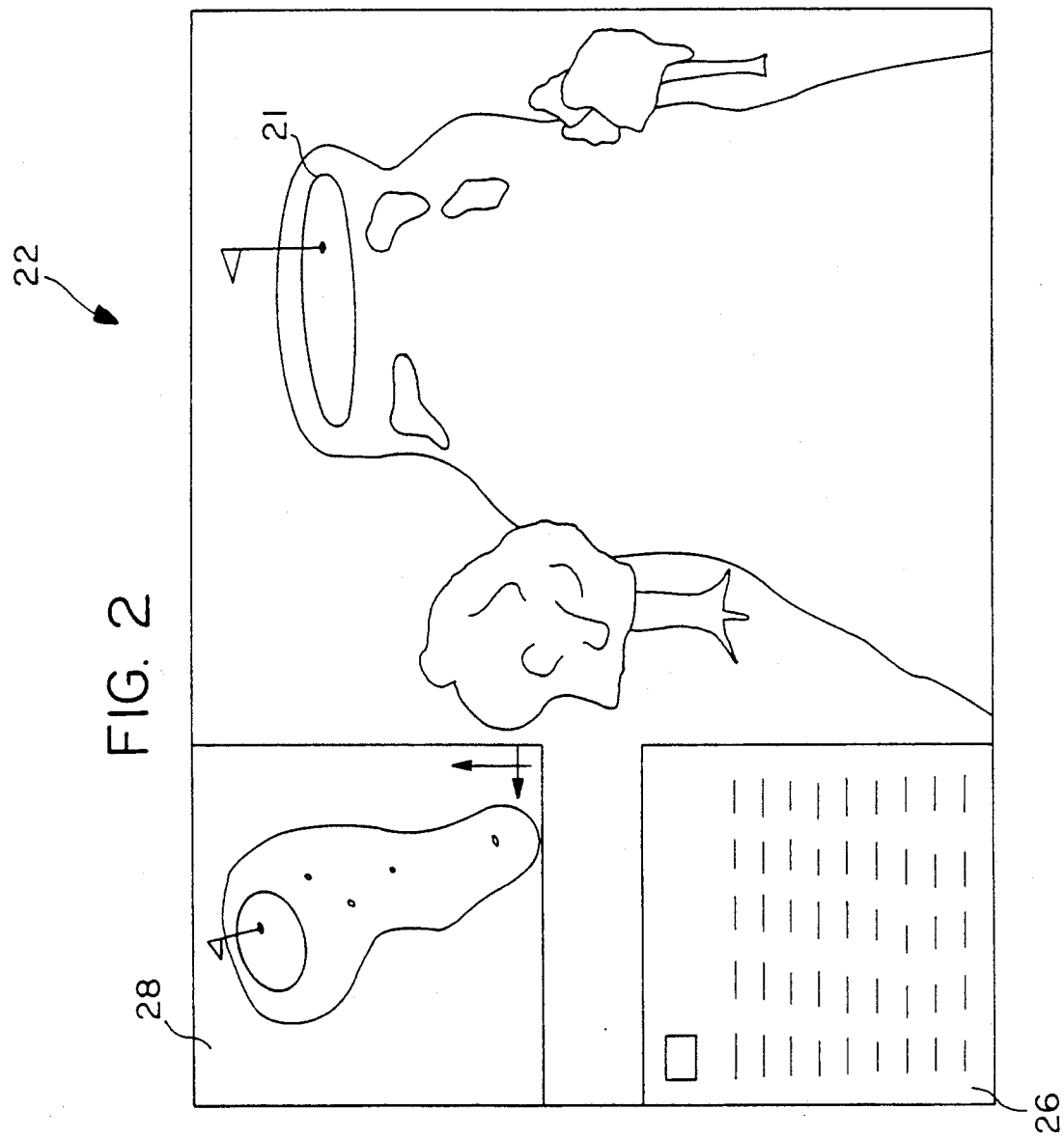
FIG. 2 shows the screen with a view of a portion of a golf course along with the windows that provide certain information to the player.

At this point the screen will show by means of the projector, the view 21 from the first tee of the course selected and the tee light 14 will be illuminated. The view on the distant screen not only shows an image of the view from the first tee but two windows initially appear as shown in FIG. 2. A window 26 will contain various statistical information such as the player's name, distance to hole, etc. Window 28 will have an image of an overhead view of the hole from the first tee or lie of the ball and thus the player will have two views of the portion of the course he has selected, namely a perspective view from the tee or lie of the ball and an overhead view in window 28 of the hole that he is playing.

With a ball in place on the tee and the tee light on, the player tees off and the ball will be driven to impact the screen 22. The swing of the golf club at the tee will be detected by a number of sensor units in the swing analyzer. A swing signal is generated to indicate that a club head has passed over a detector or sensor near the ball on the tee. Also various additional information of the swing for example the speed, direction and angle of the club head, are detected and signals representing this information passed on to the computer as will be hereinafter described. The point of impact of the ball on the screen will also be determined and signals representing this information will similarly be passed on to the computer. The information will be processed and the projector 24 under the control of the computer will project an image of the path that the ball would have taken in an unimpeded golf range. The player, of course, observes the ball flight path on the screen. At this time the ball that was driven from the tee is lying on the base 10 in front of the screen assembly 22 and the image thereof, as the ball would appear in the real golf course, is viewed on the screen. At this point the image on the screen changes and reappears to simulate the real golf course view as it would appear from the imaged location of the lie of the ball on the golf course. The player then places another golf ball on the tee and proceeds with another stroke that he would take were he located at the imaged location of the golf ball on the real course. The player may at any point discontinue progressing the ball stroke by stroke to the illustrated hole. Alternatively, he may continue until the ball is received in the hole, which normally would include one or more putts. Putting is an optional play that the player may utilize. If he does elect putting, he will place the ball on the putting area 17, the putting lights 16 will be illuminated and he will putt to hole 19 in the base 10.

Considering now the structure of the screen assembly, it is seen from FIG. 1 that the screen 22 is mounted upon a framework which includes a pair of parallel members 30 secured along each side of the base member 10. Upstanding brace members 32 and 34 extend from the horizontal members to upper structural members 36 which in general form a rectangular upper structure. The frame members may be secured together at their ends in any convenient manner as by screws or rivits. The screen 22 comprises an upstanding portion 22A and an overhead portion 22B both of which may be made of a suitable material as reinforced vinyl and capable of receiving the impact of a driven golf ball. The screen material chosen produces a detectable sound when impacted by the golf ball. The two portions 22A and 22B of the screen may be mounted to the framework as by lacing or other convenient means. The portion 22A is angled slightly forward to lessen the rebound effect of the golf ball.

A sound wave detector is located in each of the six corners of the two-part screen as indicated by the numerals 40. Reference is made to the above cited parent application for a description of the method by which the six microphones determine the point of impact of the golf ball. In general it may be stated that as the golf ball is hit from the tee, a timer associated with each of the six microphones is started.

Thereafter when the ball impacts the screen a spherically accoustical wavefront eminates from the point of impact and as this wavefront reaches each of the microphones its associated timer or counter is stopped to record the different arrive times of the accoustical wave to each microphone. Any three microphone time differentials can be used to determine the point of impact of the golf ball and this is utilized in the calculation of the trajectory that the ball would take in an unimpeded environment. The timing circuits will be hereafter described with reference to FIG. 4.

The overhead screen portion 22B serves to receive the impact of golf balls that are lofted in a high path that might otherwise overshoot the screen portion 22A. The microphone system and associated software determines the point of impact of the ball on screen portion 22A or 22B.

Figure 3:
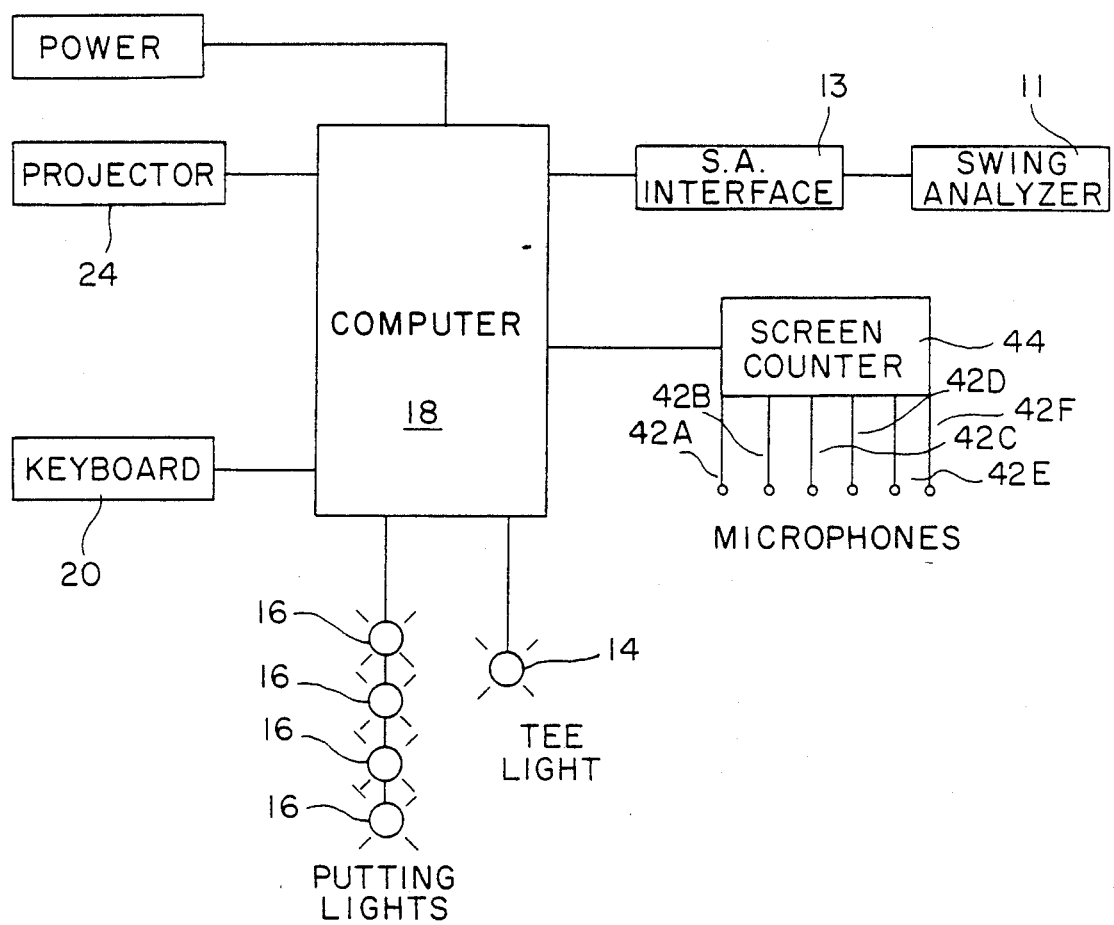
FIG. 3 is a block diagram of the control system of the present invention.

Referring now to FIG. 3 there is shown in block diagram form the various operating units of the system. The computer 18 may be a commercially available personal computer and in one constructed embodiment of the invention was an Amiga model A2000. The computer is the central control element of the simulator and executes the software of the program which may be loaded into the computer by a floppy disc. Functionally, the software starts and stops the games, sequences the golf game, and tracks the flight of each driven golf ball in play. Of prime importance, it receives input information from the screen microphones and from the swing analyzer which it utilizes to calculate the ball flight path of the driven golf ball. It then controls the projection of an image of the ball flight path that the golf ball would take were it unimpeded and not stopped by the screen 22.

The outputs 42A-42F from the six microphones 40 are passed to screen counter unit 44 which will be more fully described hereinafter and the output from the counters are then passed to the computer. With each swing, a signal from the swing analyzer is passed to the screen counter unit as indicated at 46 to start the counting function. Then as the sound from the impact of the golf ball on the screen is received by each microphone, its associated counter will record the precise times of arrival of the acoustic waves and these values are then fed to the computer which is controlled by its software to calculate the point of impact of the ball on the screen as described in the parent application. The point of impact, is utilized, along with information from the swing analyzer and time of arrival from the tee to the screen to calculate the unimpeded flight path that the golf ball would take.

The swing analyzer 11 includes electronic means to measure selected characteristics of a player's golf swing. The characteristics of particular interest at the point of impact are the speed of the golf club, the path or direction in which the club head is traveling at impact, the face position of the club face, the angle of attack and the squareness of contact. These various characteristics of each swing are detected by appropriate sensors and electrical signals are provided which are utilized to further calculate by appropriate software the flight path of a golf ball and control the various elements of the system.

One type of swing analyzer that may be employed with the present system is that shown in U.S. Pat. No. 3,601,408. It is understood that the specific details of the swing analyzer do not form part of the present invention in as much as various analyzer designs could be employed. In one construction, the analyzer described in the above cited patent was modified for left and right handed operation and otherwise redesigned for appropriate operation with the simulator of the present invention. The analyzer employs photosensors which respond to the shadow of the club head formed by the single tee light 14. The output of the analyzer is passed to an interface 13 and then to the computer input. Thus it is seen that the computer receives the information input from both the microphones and the swing analyzer to control the projector and also to control the tee light 14 and putting lights 16. In one construction a General Electric Model 210 Image Projector was employed. The projector was mounted on its side thereby projecting in vertical orientation. It is connected to the computer 18 by a high quality video cable.

Figure 4:
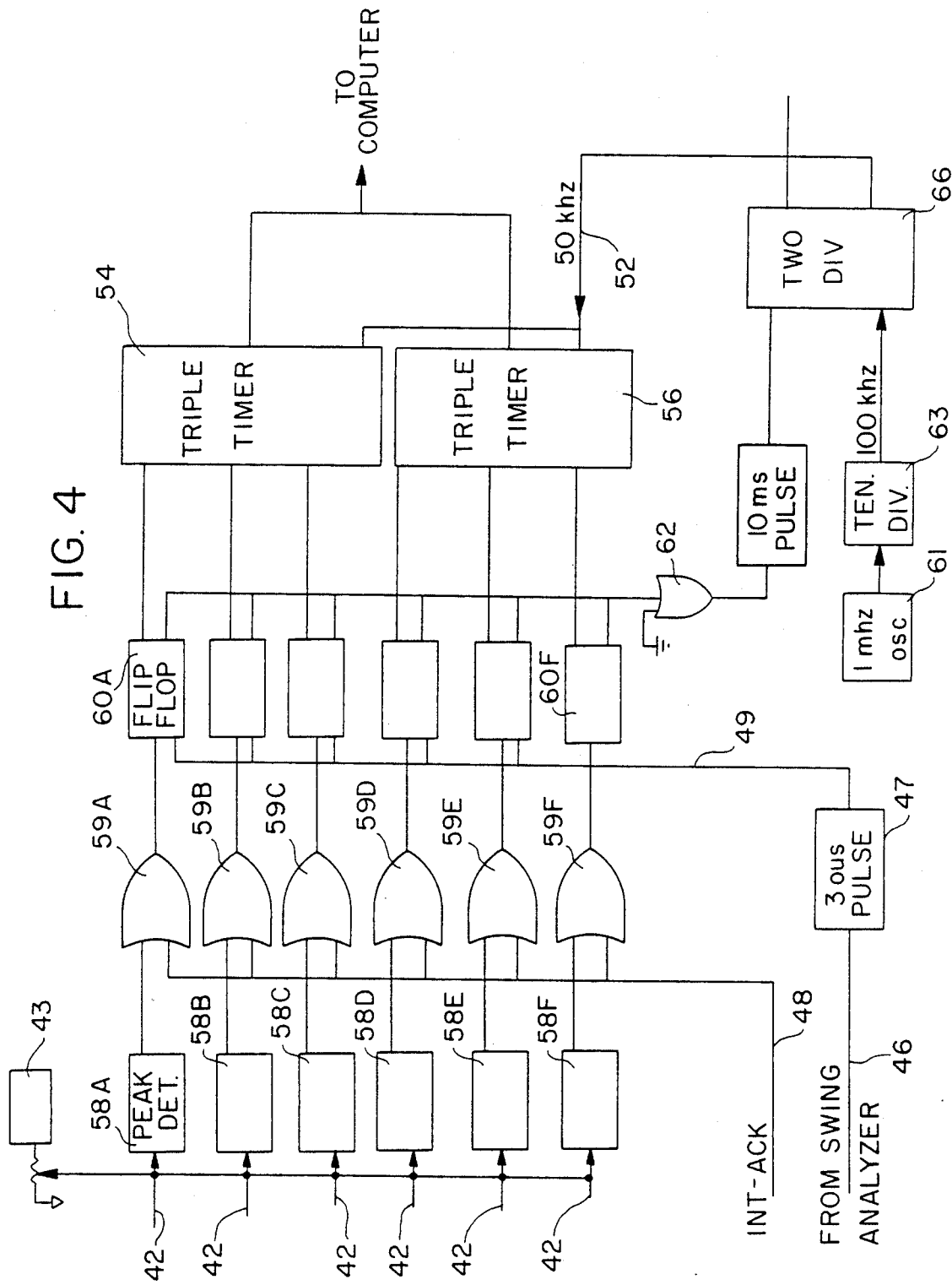
FIG. 4 is an expanded block diagram of the timing unit.

FIG. 4 is an expanded block diagram of the six channel timer for determining the impact point of a golf ball on the screen 22 given the input from the array of six microphones 40 arranged at the screen. A signal 46 indicating that the ball was hit by the club is provided from the swing analyzer 11.

The control logic is enabled by a low level condition from the computer on the interrupt acknowledge line 48. A low level on this line enables acceptance of the ball-hit signal from the swing analyzer and the computer can disable interrupts from the golf timer by maintaining the line 48 in a high state.

A ball-hit input signal 46 triggers a 30 us pulse 47 which, via 49 resets flip-flops 60A-60F, in turn resetting the six counters in two triple timer chips 54, 56. The trailing edge of the 30 us pulse serves to set the flip-flops thus enabling counting.

When the counters are enabled, a 50 khz signal 52 provides a clock to all six counters. The 50 khz signal originates from the 1 mhz oscillator 61, a ten divider circuit 63 and two divider circuit 66. When any peak detector 58A-58F outputs a high level, it resets the associated control flip-flop for that channel, which stops that channel's counter by applying a low level pulse.

The complement outputs of all six control flip-flops 60A-60F are passed to OR gate 62 to cause the first peak detector signal which arrives to trigger a 10 ms one-shot pulse. Any detector inputs which arrive subsequent to the arrival of the first input and prior to expiration of this 10 ms interval cause their associated counter to stop recording the time of arrival.

Expiration of the 10 ms pulse will cause the interrupt line to the computer to go low and simultaneously set the captured signals. This clears all of the control flip-flops which have not been reset by detection of a peak, causing all active counters to stop.

Two points in the logic should be noted. First, the network allows the timers to be repeatedly reset and restarted via ball hit 46 until the captured signal goes high, at which time intack must be set high and then low (by the computer) to re-enable recognition of the ball hit signal. Thus, an actual hit will be timed correctly. Second, if a ball-hit occurs but no screen hit is detected within 1.03 seconds then all timers will clock their respective control flip-flops by the timer out signals going high when the timers reach terminal count; this will stop all timers with the same value (within 1 count-)—use as a mis-hit indication in the computer program.

The peak detectors 58A-58F receive the outputs from their respective accoustical detectors 40 over lines 42A-42F and respond to a peak above a threshold which may be set by supply 43. The detector outputs pass to respective OR gates 59A-59F connected respectively to the flip-flops 60A-60F.

There are certain special situations which the system handles.

The player may "wiggle" the club, triggering the ball-hit signal but not hitting the ball. An interrupt is generated and the processor notes that all counts are very low, 0 or 1. This indicates that the "wiggle" situation occurred or that the ball was struck but did not hit the screen; int-ack should be immediately set low to allow a real hit to be timed following a "wiggle". The processor has about 25 ms to complete processing and re-arm the golf timer.

Another situation is when the player hits the ball but some microphone channels do not detect the impact of the ball on the screen, although at least one microphone channel does detect screen impact. The processor notes that several channels have the same count within 2 and that this group has the largest timer values. If at least 3 channels detected the impact, then calculations can proceed. Otherwise the processor must declare an error and handle it appropriately.

Also, the golf timer hardware limits the span of impact times to about 10 ms, i.e. about 500 counts. This corresponds to the propagation time of sound from one microphone to the most distant microphone, corresponding to a ball striking adjacent to a microphone. The computer can keep statistics on the number of times that a channel fails to detect a screen impact when several other channels do detect impact. This should allow detection of faulty channels relatively quickly. Some allowance may be required for the top microphones which may frequently fail to detect hits on the main screen.

Figure 5:
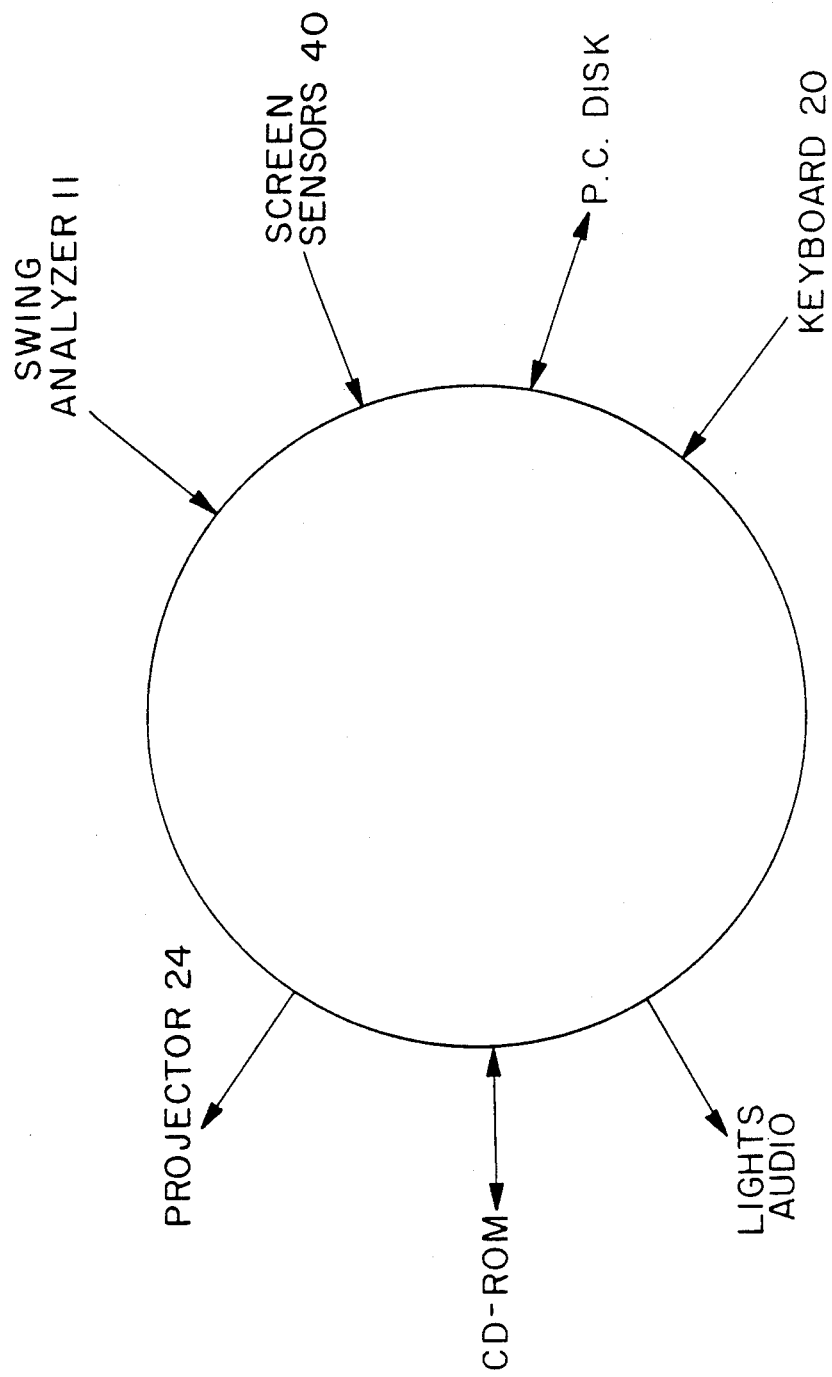
FIG. 5 is a graphic illustration of the interfaces of the components of the system as a top level software flow diagram.

Although the particular software does not form part of the present invention, the external interfaces of the software will be described with reference to FIG. 5 in order to more fully explain the interaction of the above-described components of the system.

From this figure, it is seen that the interfaces are the swing analyzer 11, screen sensors 40, a disk which may be hard or floppy, Keyboard 20, image projector 24, CD-ROM containing the course information and discreet controls such as the putting lights, tee lights and audio.

The swing analyzer is used to detect the characteristics of the golf club swing as it hits the golf ball and provides inputs which are received over a serial port of the computer. The swing analyzer interrupts the control processor when it has data ready to send by activating a request to send signal. The data items received from the swing analyzer and heretofore described are inputs received for each swing and each data item may be an eight bit number. The output to the swing analyzer is a clear to send signal.

The screen sensor hardware as described above in connection with FIG. 4 is six counters, one for each microphone. The counters are started when the ball is hit and are latched when the acoustic signal is detected by the microphone. The inputs are simply six binary numbers each of which may be 16 bits long and there are no outputs to the screen sensor hardware.

The CD-ROM has stored the images from the various positions of each hole, the golf course geography data base, overhead graphics of each hole and of the entire course and other material.

The keyboard provides the capability to accept inputs from the players of the simulator and this is an input only interface. It consists of game start and configure commands such as request to play a round, number of players, handicaps, etc.

The PC disk contains the general software program for the simulator. Also there are various discreet input lines and discreet control lines to the external devices such as the lights 16, tee light 14 and audio signals.

It is seen from the above that with the information received from the swing analyzer and the screen counters, the software algorithm is able to utilize the information on the trajectory, velocity and spin of the ball to accurately determine the ball flight path.

Having thus described the invention with particular reference to the preferred forms thereof, it will be obvious that various changes and modifications may be made therein without departing from the spirit and scope of the invention as defined in the appended claims.

What is claimed is:

1. An indoor golf simulator comprising:
   a tee area and a target screen spaced apart a distance over which a golf ball may be driven from the tee to said target screen;
   projector means for projecting images onto said target screen;
   computer means connected to the projector means for supplying information to the projector means;
   golf swing analyzer means located at the tee area for providing signals representative of the characteristics of a golf swing at the tee area;
   at least three acoustical detector means positioned at predetermined locations adjacent to a portion of said target screen for receiving a sound wave originating and radiating from the point of impact of the golf ball on said target screen;
   first means for measuring the distance from a start point at the tee area to the point of impact of the golf ball on said target screen, and for determining the flight time of the golf ball;
   second means for determining the first time the sound wave reaches each of the first three acoustical detector means;
   third means for determining the time difference values amongst said second means determinations to calculate the point of impact of the golf ball on said target screen by using an algorithm that is based upon the pythagorean theorem, said third means for also determining an actual coordinate of the point of impact and for generating a signal representative of the actual coordinate;
   fourth means for calculating the initial velocity of the golf ball by using said first means and the calculated point of impact of said third means to calculate three vector components of the initial velocity of the golf ball, said fourth means for generating a signal representative of the initial velocity of the golf ball;
   fifth means connecting said golf swing analyzer means, said acoustical means, and said third and fourth means to said computer means,
   wherein the signals representative of the characteristics of the golf swing and the signals representative of the initial velocity and the point of impact of the golf ball on said target screen are then inputted by said fifth means into said computer means to derive an unimpeded ball flight path, and wherein said computer means generates a signal to control the projector means that provides an image of the unimpeded ball flight path of the golf ball.

2. The simulator as set forth in claim 1, wherein said target screen is positioned a fixed predetermined distance from the tee area.

3. The simulator as set forth in claim 2, wherein said target screen includes a substantially upright section and an overhead section.

4. The simulator as set forth in claim 3, wherein said target screen is a vinyl material which provides sound waves upon the impact of a golf ball to be detected by the at least three acoustical detector means.

5. The simulator as set forth in claim 1, wherein the at least three acoustical detector means includes three sound detectors located at outer peripheral points of said target screen.

6. The simulator as set forth in claim 5, wherein each sound detector is angled inward toward the interior of said target screen.

7. The simulator as set forth in claim 1, further including counter means connected to the at least three acoustical detector means and means connecting the swing analyzer means to the counter means whereby a swing signal from the swing analyzer means initiates actuation of the counter means.

8. An indoor golf simulator comprising:
a tee area and a target screen spaced apart a distance over which a golf ball may be driven from the tee area to said target screen;
optical projector means for projecting images onto said target screen;
computer means connected to the projector means for supplying information to control said optical projector means;
golf swing analyzer means located at the tee area for providing signals representative of the characteristics of a golf swing at the tee area;
light means connected to the computer means and disposed to illuminate the tee area and said golf swing analyzer means;
at least three acoustical detector means positioned adjacent to a portion of said target screen for receiving a sound wave originating and radiating from the point of impact of the golf ball on said target screen driven from the tee area;
first means for measuring the distance from a start point at the tee area to the point of impact of the golf ball on said target screen, and for determining the flight time of the golf ball;
second means for determining the first time the sound wave reaches each of the first three acoustical detector means;
third means for determining the time difference values amongst said second means determinations to calculate the point of impact of the golf ball on said target screen by using an algorithm that is based upon the pythagorean theorem, said third means for also determining an actual coordinate of the point of impact and for generating a signal representative of the actual coordinate;
fourth means for calculating the initial velocity of the golf ball by using said first means and the calculated point of impact of said third means to calculate three vector components of the initial velocity of the golf ball, said fourth means for generating a signal representative of the initial velocity of the golf ball;
fifth means connecting said golf swing analyzer means, said acoustical detector means, and said third and fourth means to said computer means,
wherein the signals representative of the characteristics of the golf swing and the signals representative of the initial velocity and the point of impact of the golf ball on said target screen are then inputted by said fifth means into said computer means to derive an unimpeded ball flight path, and wherein said computer means generates a signal to control the optical projector means that provides an image of the unimpeded ball flight path of the golf ball.

9. The simulator as set forth in claim 8, wherein said computer means is adapted to receive one of a plurality of memory means and each memory means contains a representation of a different golf course.

10. The simulator as set forth in claim 9, wherein each said memory means is a compact disk read only memory.

11. The simulator as set forth in claim 8, wherein the at least three acoustical detector means comprises three sound wave detectors located at predetermined locations adjacent to said target screen to receive the sound waves originating and radiating from the point of impact.

12. The simulator as set forth in claim 11, wherein said target screen comprises two portions disposed at an angle to each other along a common edge thereof.

13. The simulator as set forth in claim 8, wherein the at least three acoustical detector means is six.

14. The simulator as set forth in claim 13, wherein said target screen includes a substantially upright portion and an overhead portion.

15. An indoor golf simulator comprising:
a tee area and a target screen spaced apart a distance over which a golf ball may be driven from the tee area to said target screen;
projector means for projecting images onto said target screen;
computer means connected to said projector means for supplying video information to said projector means;
golf swing analyzer means located at the tee area for providing signals representative of the initial spin imparted to the golf ball at the tee area;
at least three sound wave detector means positioned at predetermined locations adjacent to a portion of said target screen for receiving a sound wave originating and radiating from the point of impact of the golf ball on said target screen;
first means for measuring the distance from a start point at the tee area to the point of impact of the golf ball on said target screen, and for determining the flight time of the golf ball;
second means for determining the first time the sound wave reaches each of the first three of the sound wave detectors;
third means for determining the time difference values amongst said second means determinations to calculate the point of impact of the golf ball on said target screen by using an algorithm that is based upon the pythagorean theorem, said third means for also determining an actual coordinate of the point of impact and for generating a signal representative of the actual coordinate;
fourth means for calculating the initial velocity of the golf ball by using said first means and the calculated point of impact of said third means to calculate three vector components of the initial velocity of the golf ball, said fourth means for generating a signal representative of the initial velocity of the golf ball;
fifth means connecting said golf swing analyzer means, said sound wave detector means, and said third and fourth means to said computer means,
wherein the signals representative of the initial spin imparted to the golf ball at the tee area and the signals representative of the initial velocity and the point of impact of the golf ball on said target screen are then inputted by said fifth means into said computer means to derive an unimpeded ball flight path, wherein said computer means generates a signal to control the projector means that provides an image of the unimpeded ball flight path of the golf ball.

16. The simulator as set forth in claim 15, wherein the ball flight path is determined by signals representative of the ball trajectory, spin and velocity.

17. The simulator as set forth in claim 15, wherein the signals from said golf swing analyzer means and said at least three sound wave detector means are factors in the determination of the trajectory, spin and velocity of the golf ball.

18. The simulator of claim 15, further including timer means positioned to be activated as the golf ball is driven from the tee.

* * * * *